UNITED STATES PATENT OFFICE.

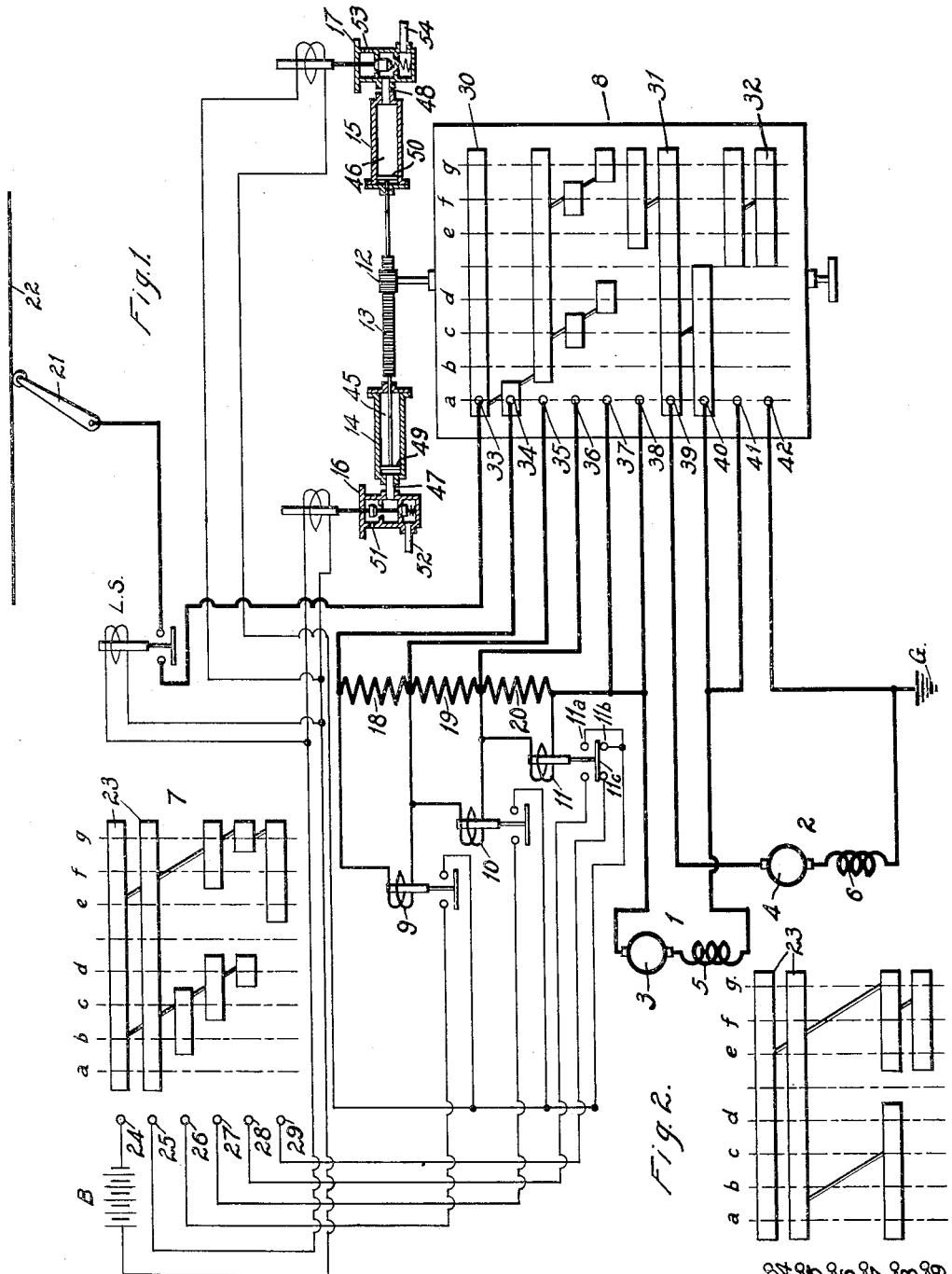

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,292,599.

Specification of Letters Patent.

Patented Jan. 28, 1919.

Application filed October 27, 1915. Serial No. 58,150.

*To all whom it may concern:*

Be it known that I, ARTHUR J. HALL, a subject of the King of England, and a resident of Wilkinsburg, in the county of Allegheny and State of Pennsylvania, have invented a new and useful Improvement in Control Systems, of which the following is a specification.

My invention relates to control systems and particularly to automatic control systems having power-actuated drum controllers.

One object of my invention is to provide a system of the above indicated class for automatically effecting step-by-step movements of the controller drum by a means the operation of which shall be dependent upon the current traversing the motor circuit or upon some other suitable condition of the system.

Another object of my invention is to provide a system, for the above purpose, with a relay means which, with the master controller, shall effect a step-by-step movement of the drum controller when the motors are in series and in parallel-circuit relation.

More specifically, the object of my invention is to provide a control system with a drum controller to govern the operation of the motors in series or in parallel-circuit relation. In my preferred system, this drum controller is moved, step-by-step, by a fluid-operated device which is governed by a master controller and a plurality of relays. The coils of the relays are connected across each of the resistors in the motor circuit. Thus, the changing of the master controller from one position to another completes a circuit through one of the relays and controls the fluid-operated means of the drum controller so that the latter is moved one notch. As the drum controller moves, the circuit of the relay, at that time controlling the drum-operating means, is broken and the circuit of another relay is prepared for the next step of the master controller.

In control systems of this class, the usual construction is to have an auxiliary control drum attached to the main drum to break the circuit of the drum-operating means.

Thus, in such systems, each step-by-step movement is initiated by a master controller and stopped by an auxiliary controller attached to the main drum controller.

According to my invention, however, relays stop the motion of the drum controller which is initiated by the master controller. This is accomplished by having the coils of the relays connected across the various resistors which are governed by the drum controller. Thus, when a resistor is excluded from the motor circuit by the drum controller being moved one notch, the relay connected across the said resistor is deënergized, and the movement of the drum controller is stopped.

My invention is illustrated in the accompanying drawing in which Figure 1 is a diagrammatic view of the controllers and circuit connections in a control system involving my invention, and Fig. 2 is a diagrammatic view of a master controller for performing automatic acceleration.

Referring to Fig. 1 of the drawing, two motors 1 and 2, having armatures 3 and 4 and field-magnet windings 5 and 6, are governed by a master controller 7, a drum controller 8 and relays 9, 10 and 11. When the armature of relay 11 is electro-magnetically actuated, its contact member 11$^c$ bridges a pair of contact terminals 11$^a$, and, when released, its members 11$^c$ bridges contact terminals 11$^b$. The drum controller 8 is operated by a pinion 12, rack bar 13 and two fluid-pressure devices 14 and 15 which are controlled by a standard valve 16 and an inverted valve 17.

The motors 1 and 2 are initially in series with resistors 18, 19 and 20 and are connected by a line switch LS to trolley 21 that engages trolley conductor 22.

The master controller 7 embodies a movable member 23 having inter-connected contact segments which coöperate with stationary contact fingers 24, 25, 26, 27, 28 and 29 to control the operation of line switch LS, and valves 16 and 17 by energy supplied from a battery B.

The drum controller 8 embodies movable sets of contact segments 30, 31 and 32 which coöperate with stationary contact fingers 33, 34, 35, 36, 37, 38, 39, 40, 41 and 42.

The fluid-pressure devices 14 and 15 are similar in construction and embody cylinders 45 and 46 having ports 47 and 48 which open into the chambers of valves 16 and 17, and pistons 49 and 50 which are attached to the rack bar 13 and operate within the cylinders 45 and 46.

The valve 16 is a standard valve and, in the position shown, connects the port 47 of cylinder 45 with an exhaust port 51 and closes an inlet opening which is connected to the air-supply pipe 52. When the valve 16 is electro-magnetically actuated, it closes the exhaust port 51 and connects the port 47 of cylinder 45 with the air-supply pipe 52. The valve 17 is an inverted valve and, in the position shown, connects the port 48 of cylinder 46 with an air-supply pipe 54 and closes an exhaust port 53, and, when electro-magnetically actuated, it connects port 48 with the exhaust port 53 and closes the opening to the air-supply pipe 54.

Considering the system in its initial or zero position, as shown in the drawing, the motors 1 and 2 may be operated in four series positions and three parallel positions, as follows:

The master controller is first moved to position $a$ to effect engagement of the movable segments 23 with contact fingers 24 and 25, whereby a circuit is closed from battery B through the line switch LS and the actuating coil of valve 16. This circuit is kept closed throughout all positions of the master controller. The coil of valve 16 is energized to connect the port 47 of cylinder 45 to the air-supply pipe 52, but no movement of rack 13 is effected because the cylinder 46 is connected to air-supply pipe 54. The line switch LS, also, is operated, in position $a$ of the master controller, to close a circuit from trolley conductor 22 through trolley 21, switch LS, contact finger 33, controller segment 30, contact finger 34, resistor 18 and coil of relay 9 in parallel, resistors 19 and coil of relay 10 in parallel, resistor 20 and coil of relay 11 in parallel, motor 1, contact finger 40, controller segment 31, contact finger 39, and motor 2 to ground G. The motors 1 and 2 and the relays 9, 10 and 11 are thus energized. The relays 9, 10 and 11 close no circuit at this time but prepare circuits which are closed when the master controller is moved into position $b$, $c$ and $d$.

The master controller is then moved into position $b$ in which controller segment 23 engages contact finger 26. This closes a circuit from one terminal of battery B, through controller segment 23, contact finger 26, relay 9, and coil of valve 17 to the other terminal of the battery. The valve 17 is then operated to disconnect the cylinder 46 from the air-supply pipe 54 and to connect it to the exhaust port 53. Thus, the fluid-pressure device 14, which is supplied with air pressure by means of valve 16, moves the drum controller 8 from position $a$ to position $b$. As the controller 8 moves into position $b$, the connection between contact finger 34 and controller segment 30 is broken, and contact is made between controller segment 30 and contact finger 35. Thus, the resistor 18 and the coil of relay 9 are excluded from the motor circuit which causes the coil of relay 9 to be deënergized. By deënergizing the coil of relay 9, the energizing circuit for the coil of valve 17 is broken, and the fluid-pressure device 15 is connected to the air-supply pipe 54 so that movement of controller 8 is stopped in position $b$.

The relays 10 and 11, which were energized when the master controller was moved to position $a$, prepare circuits for the coil of valve 17 that are closed when the master controller 7 is moved to positions $c$ and $d$. Thus, as the master controller is moved to positions $c$ and $d$, contact is made between segment 23 and contact finger 27 and then between segment 23 and contact finger 28, and the coil of valve 17 is energized through a circuit including the contact members of relays 10 and 11. Thus, controller 8 is moved in successive steps to positions $c$ and $d$, in a manner similar to the last steps explained in detail, and the coils of relays 10 and 11 and the resistors 19 and 20 are successively excluded from the circuits of motors 1 and 2.

As has been set forth, the member $11^c$ of relay 11 bridges contact terminals $11^a$ when electro-magnetically actuated and contact terminals $11^b$ when released. The contact members $11^b$ are bridged by the member $11^c$ of relay 11 when the drum controller 8 has reached its full-series position, and the coil of relay 11 and the resistor 20 are thus excluded from the motor circuit to prepare a circuit to be closed when the master controller is moved to position $e$. In moving the master controller through the transition step from position $d$ to position $e$, the controller segment 23 breaks contact with the contact fingers 27 and 28 and makes contact with the contact finger 29. Thus, a circuit is closed from one terminal of battery B, through controller segment 23, contact finger 29, contact members $11^c$ and $11^b$, and the coil of valve 17 to the other terminal of the battery. The controller 8 is thus moved through its transition step from position $d$ to position $e$.

The controller 8, in moving from position $d$ to position $e$, changes the motors 1 and 2 from series-circuit relation to parallel-circuit relation. Connection is broken between controller segment 30 and contact finger 37 and between controller segment 31 and contact finger 40, and contact is made between controller segment 31 and contact finger 38 and between controller segment 32 and contact fingers 41 and 42. Thus, a circuit is closed from trolley conductor 22 through trolley 21, line switch LS, contact finger 33, controller segment 30, contact finger 35, resistor 19 and the coil of relay 10 in parallel and resistor 20 and the coil of relay 11 in parallel, where the circuit divides, one branch including motor 1, contact finger 41, controller segment 32, and contact finger 42 to ground G, and the second branch including contact finger 38, controller segment 31, contact finger 39 and motor 2, to ground G. Thus, motors 1 and 2 are connected in parallel through resistors 19 and 20 to the trolley conductor 22. The coils of relays 10 and 11 are energized at this time but perform no useful function until the master controller has been moved to positions $f$ and $g$. The energizing of the coil of relay 11, it may be noted, serves to break the circuit traced above for energizing the coil of valve 17.

In moving the master controller from position $e$ to position $f$ and then to position $g$, circuits are closed through relays 10 and 11 to energize the coil of valve 17 and to move controller 8 two successive steps. The drum controller 8, in moving from position $e$ to positions $f$ and $g$, connects the controller segment 30 to contact fingers 36 and 37 in succession and thus excludes the resistors 19 and 20 and coils of relays 10 and 11 from the motor circuits. The coils of relays 10 and 11 are deënergized when the resistors 19 and 20 are excluded from the motor circuits, in a manner similar to that explained in describing the series position of controller 8.

Automatic acceleration, with one stop at full-series position, may be accomplished by changing the design of the master controller, as indicated in Fig. 2, so as to exclude relays 9 and 10. These changes consist in extending the two portions of the master controller segment 23 which coöperate with contact finger 28, and disconnecting the conductors which are joined to contact fingers 26 and 27. Thus, with a master controller as shown in Fig. 2, the motors will be automatically accelerated to full-series position when the master controller is moved to its first position. The line switch LS and valve 16 are operated as explained in describing the step-by-step movement of the drum controller. The coil of valve 17 is energized by a circuit from one terminal of battery B through controller segment 23, contact finger 28 contact member 11$^c$ of relay 11, contact terminals 11$^a$ and the coil of valve 17 to the other terminal of the battery. This circuit remains closed until the drum controller 8 has been moved to position $d$, and resistor 20 and relay 11 have been excluded from the motor circuits.

When the master controller is moved from position $d$ to position $e$, a circuit is closed from one terminal of battery B, through controller segment 23, contact finger 29, contact member 11$^c$ of relay 11, contact terminals 11$^b$ and the coil of valve 17 to the other terminal of the battery. Thus, the drum controller is moved to position $e$, and the coil of relay 11 is energized so that its member 11$^c$ breaks contact with terminals 11$^b$ and makes contact with terminals 11$^a$. The movement of the drum controller is not stopped, however, as this position of the member 11$^c$ closes a circuit through the coil of valve 17. The second circuit is closed through contact finger 28 and controller segment 23. Thus, the drum controller 8 is moved to its full-parallel position.

In order to return the system to zero position, the master controller 7 is returned to zero position, thus breaking all control circuits which include battery B. Accordingly, the line switch LS and the coil of valve 16 are deënergized. The valve 16 opens the cylinder 45 to the exhaust port 51, whereby the fluid-pressure device 15, which is now connected to the air-supply pipe 54, will return the drum controller 8 to its $a$ or initial position.

Obviously, the circuit connections and apparatus of my invention may be varied considerably, without departing from the spirit and scope of my invention, and I desire, therefore, that only such limitations shall be imposed as are indicated in the appended claims.

I claim as my invention:

1. In a control system, the combination with a motor, a drum controller connected to the motor, and a fluid-pressure device for operating said drum controller, of a master controller and relay means governed by the drum controller, said relay means coacting with the master controller to selectively operate the fluid device and effect a step-by-step movement of the drum controller.

2. In a control system, the combination with a motor, a drum controller connected to said motor for governing the operation thereof, a fluid-pressure device for operating said controller, and valves for controlling said fluid-pressure device, of a plurality of accelerating resistors, a master controller, and relay means connected in shunt to said resistors for governing said valves and controlling the operation of said drum controller in successive steps.

3. In a control system, the combination with a motor, a drum controller, a fluid-pressure device for operating said controller, two valves for governing said device, a plurality of resistors governed by said drum controller, and relays connected in shunt around said resistors, of a master controller and means controlled by said master controller and relays for controlling the operation of said valves, advancing said drum controller in successive steps and excluding said resistors from the motor circuit.

4. In a control system, the combination with a motor, a drum controller, an actuating device for said controller, valves for controlling said actuating device, a plurality of resistors in the motor circuit which are governed by said drum controller, and relays connected around said resistors, of a master controller and means whereby said controllers and relays control the operation of said valves and exclude said resistors from the motor circuit in successive steps.

5. In a control system, the combination with a motor, a power circuit, a drum controller for governing said motor, a fluid-pressure device for actuating said drum controller, and a plurality of relays and resistors, said relays being operated by the current flowing through the motor, of a master controller for connecting said motor to the power circuit and for governing the operation of said relays for controlling the operation of said drum controller in successive steps to exclude said resistors from the motor circuit.

6. In a control system, the combination with an electric motor, a controller connected to said motor for governing the operation thereof, and an electrically-controlled fluid-pressure device for actuating said controller, of a plurality of accelerating resistors, and relay means connected in shunt to said resistors and responsive to the current traversing said motor for automatically governing the operation of said electrically controlled actuating device.

7. In a control system, the combination with a motor, a drum controller connected to said motor, a fluid-pressure device for said drum controller, valves for controlling said fluid-pressure device, a plurality of relays operated by the current flowing through the motor, and a source of power, of a master controller and means operated by said master controller for connecting said motor to the source of power and for controlling the operation of said relays and valves, whereby said motor is governed in successive steps.

8. A control system for an electric motor comprising a drum controller for governing the motor circuit, a fluid-pressure mechanism for the drum controller, valves for governing the admission and release of fluid pressure to and from said mechanism, a plurality of relays operatively connected to said drum controller, a master controller coöperating with said relays for governing said valves, and means dependent upon predetermined conditions in the motor circuit for interrupting the control circuit of one of said valves to delay the advancement of the drum controller.

9. In a control system, the combination with a plurality of motors having a plurality of resistors in series therewith, a drum controller for governing the operation of said motors and for short circuiting said resistors, means for operating said drum controller, a plurality of relays respectively connected across said resistors, and a master controller, of means controlled by said master controller and relays for operating said drum controller step by step and thus connecting said motors in series and in parallel-circuit relation.

10. In a control system, the combination with a plurality of motors, a drum controller, a fluid-pressure device for operating said controller, valves for controlling said fluid-pressure device, and a plurality of relays operated by current flowing through the motors, of a master controller for governing the operation of said relays and of said valves to advance said drum controller by successive steps for governing the operation of said motor in series and in parallel-circuit relation.

11. In a control system, the combination with a motor having a plurality of resistors in series therewith, a drum controller connected to said motor for governing the operation thereof, a fluid-pressure device for said controller, a plurality of valves for controlling said fluid-pressure device, a plurality of relays respectively connected across said resistors, and a master controller, of means for energizing said motor, one of said valves and the relays connected to said resistors, when said master controller is moved into its first position, and means for energizing one of said valves through said master controller and one of said relays, whereby said drum controller is operated one notch to exclude one resistor and one relay from the motor circuit.

12. In a control system, the combination with a motor having a plurality of resistors in series therewith, a power circuit, a drum controller connected to said motor for governing the operation thereof, means for operating said drum controller, a plurality of relays connected across said resistors, and a master controller, of means for connecting said motor to the power circuit and for energizing the relays connected across said resistors when said master controller is moved into its first position, and means for governing said drum controller operating means through said master controller and said relays in each succeeding position of the master controller whereby said drum controller is operated one notch to exclude one resistor and one relay from the motor circuit.

13. In a control system, the combination with a motor, a main controller for governing the operation of the motor, an electro-pneumatic means for operating the main controller, of a circuit for operating said electro-pneumatic means, a master controller for completing said circuit and a plurality of relays for intermittently opening said circuit.

14. In a system of control, a main controller, means for operating the controller, a master controller for initiating the operation of said controller means, and a plurality of relays successively operated to stop the operation of said controller means.

In testimony whereof I have hereunto subscribed my name this 23rd day of Oct., 1915.

ARTHUR J. HALL.